W. Banzett,
Butter Package.
Nº 83,020.    Patented Oct. 13, 1868.
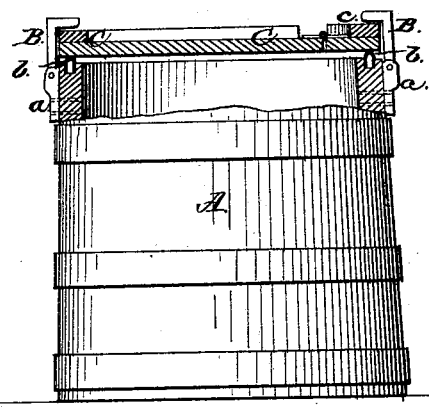
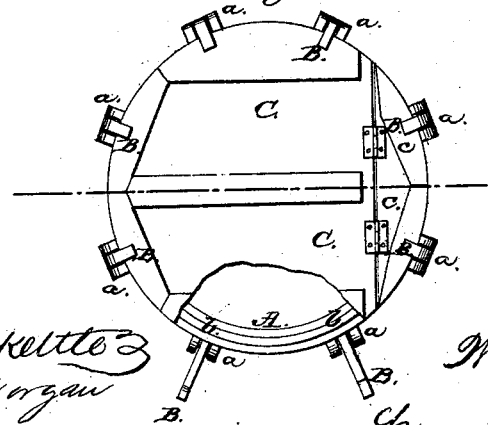
Attest:
W. C. Ashkettle
Wm. A. Morgan
Inventor:
Wm. Banzett
per Munn & Co.
Attorneys

WILLIAM BANZETT, OF BROOKLYN, NEW YORK.

Letters Patent No. 83,020, dated October 13, 1868.

IMPROVED LEACH-TUB.

The Schedule referred to in these Letters Patent and making part of the same.

*To all whom it may concern:*

Be it known that I, WILLIAM BANZETT, of Brooklyn, in the county of Kings, and State of New York, have invented a new and improved Leach-Tub; and I do hereby declare that the following is a full, clear, and exact description thereof, which will enable others skilled in the art to make and use the same, reference being had to the accompanying drawings, forming part of this specification.

Figure 1 represents a side elevation, partly in section, of my improved leach-tub.

Figure 2 is a plan or top view of the same.

Similar letters of reference indicate corresponding parts.

This invention relates to a new manner of securing the cover to a standing leach-tub, and consists in the use of an elastic packing-strip, interposed between the edge of the tub and the cover, and of a series of hooks pivoted to the tub, by which hooks the cover can be securely clamped upon the tub, yet so that it can be easily removed when desired.

Heretofore, leach-tubs were closed by means of covers placed loose upon them, and they always failed to close air-tight, and did not prevent the gases from escaping from the tub.

The object of my invention is to produce a device by which an air-tight, but still easily removable covering, may be had on the tub.

A, in the drawing, represents a leach-tub, of ordinary or suitable construction. To its outside are, near to its upper end, is fastened a series of projecting lugs or ears, $a\ a$, to which the lower ends of L-shaped bars or hooks, B B, are pivoted, as shown. An elastic band, $b$, is fastened upon the upper edge of the tub, by being sunk in a groove arranged in the edge, as in fig. 1, or otherwise, so that the strip $b$ projects above the edge of the tub, as shown.

C is the cover of the tub. The same is made in suitable manner, of suitable material. When it is placed upon the tub, it rests on the elastic strip $b$, and can then, by means of the hooks B B, be clamped in position, as shown in fig. 1, thus affording an air-tight enclosure for the tub.

When the cover is to be taken off, the hooks have to be folded back, and it is then free to be removed.

The packing-strip $b$ may, instead of being secured to the edge of the tub, be fastened to the under side of the cover.

A portion, $c$, of the cover may be hinged to the main part of the same, to allow liquid to be poured into the tub, without necessitating the removal of the cover for that purpose.

I claim as new, and desire to secure by Letters Patent—

A leach-tub, constructed as described, namely, with the cover C, battened around its edges on top, and having the hinged portion $c$, and held by the clamps B, having bevelled forward ends, said clamps being hinged to the ears $a$, which are secured to the sides of the tub, all arranged as herein shown, for the purpose specified.

W. BANZETT.

Witnesses:
WM. F. MCNAMARA,
ALEX. F. ROBERTS